United States Patent [19]

Rocton

[11] 4,079,927

[45] Mar. 21, 1978

[54] CONNECTION SUPPORT FOR OPTICAL FIBRES

[75] Inventor: Lucien Rocton, Malakoff, France

[73] Assignee: Compagnie Industrielle des Telecommunications Cit-Alcatel S.A., Paris, France

[21] Appl. No.: 740,247

[22] Filed: Nov. 9, 1976

[30] Foreign Application Priority Data

Nov. 21, 1975  France .................. 75 35688

[51] Int. Cl.² ........................................... B25B 11/02
[52] U.S. Cl. ................................. 269/296; 29/592 R; 269/321 WE
[58] Field of Search ........... 269/289 R, 296, 321 WE; 29/592, 759, 760, 464–468

[56] References Cited

U.S. PATENT DOCUMENTS 3,223,406  12/1965  Hans-Georg ................. 269/321 WE
3,347,179  10/1967  Haidinyak ........................ 269/296

OTHER PUBLICATIONS

Western Electric, *Technical Digest;* "Optical Fiber Alignment Chuck", C. D. Spainhour; No. 46, Apr. 1977.

*Primary Examiner*—Robert C. Watson
*Attorney, Agent, or Firm*—Roland Plottel

[57] ABSTRACT

The invention relates to optical fibre telecommunication engineering. A connection support for optical fibres has a stand one of whose faces has a grid of parallel rectilinear grooves each arranged for accomodating the ends of two optical fibres placed end to end with a view to connecting them together. The middle part of each groove in which is effected the transition between the fibres being formed by an insert in the stand in the shape of a comb and the stand is divided into two halves along a mid plane perpendicular to the grid of grooves.

5 Claims, 3 Drawing Figures

CONNECTION SUPPORT FOR OPTICAL FIBRES

The invention relates to optical fibre transmission and in particular to connections between optical fibres.

An optical fibre transmission link necessarily has connections whether for joining two lengths of optical fibre or for providing access to end units or intermediate units for the regeneration and amplifying of signals. Connection between two optical fibres consists in placing them end to end so that a light signal can pass from one to the other with as little loss as possible. This is a difficult operation, because an optical fibres has a small diameter which is in the order of a hundred or so microns and because tight mechanical tolerances must be adhered to for the loss not to be too great: decentering error less than three microns, alinement angle error less than one degree and residual gap between the ends of the optical fibres less than thirty microns.

Various known supports or jigs facilitate these connection operations: one of these is formed by a block one of whose faces has a grid of parallel rectilinear grooves each arranged for accomodating the ends of two optical fibres placed end to end a view to connecting them together. The use thereof requires the use of micrometric positioning devices and a microscope check to prevent the overlapping of the ends of the fibres without forming a prohibitive gap between them. Further, the walls of the grooves must be machined with very great care, for the precision of the alinement of the fibres depends on this.

To avoid these drawbacks, it was thought possible to obtain automatic alinement of the fibres by means of a connection sleeve fitted on the ends of the optical fibres to be connected together and crimped thereto, this sleeve being filled with a drop of a liquid having the same refraction index as the fibres for attenuating the loss due to the residual gap remaining between the ends of the fibres.

In actual fact, the positioning of the sleeve on the ends of the fibres, the crimping thereof and the filling thereof with a liquid are operations which are made difficult by the small diameters of the optical fibres and of the sleeve and which can be effected only in a laboratory, this excluding the large-scale use of this connection method.

Preferred embodiments of the present invention facilitate the connection operations between the optical fibres by means of a connection support which is simple to manufacture and to use.

The present invention provides a connection support for optical fibres comprising a stand having a working surface in which there is a grid of parallel rectilinear grooves, each arranged for accomodating the ends of two optical fibres placed end to end with a view to connecting them together, wherein the middle part of each groove in which is effected the transition between the two optical fibres to be connected together is formed by an insert in said stand.

The present invention also relates to a method of implementing the above-described connection support for the inter-connection of two bundles of optical fibres, the method comprising the following stages:

Separate cabling of two halves of the stand, a plate being fixed to each half of the stand in the place of the other half and used as a stop for the ends of the optical fibres;

Removal of the plates and assembling of the two halves of the stand and installing of the insert until desired alinement is achieved.

An embodiment of the invention is described by way of an example with reference to the accompanying drawing, in which.

Figure 1:
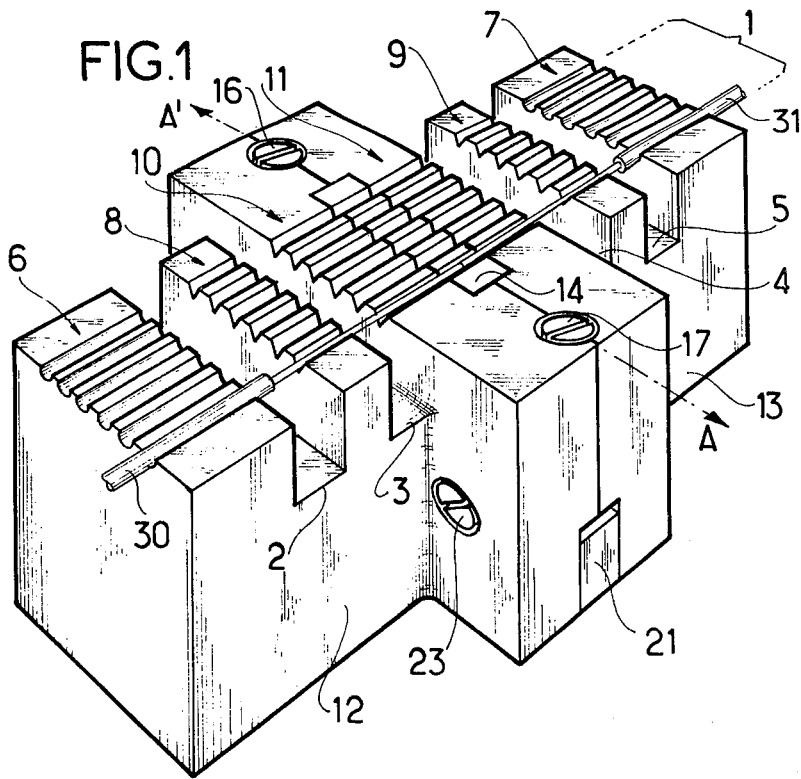
FIG. 1 is a perspective view of a connection support for fibres.

The connection support shown in the figures is intended for connecting together two bundles of six optical fibres individually covered with a protective covering. FIG. 1 shows a stand whose top surface has a grid 1 of six parallel rectilinear grooves each of which is used for connecting together two optical fibres 30, 31 from different ones of the bundles and placed end to end. A slot is formed in the top surface of the stand along a mid plane which is perpendicular to the grid and referenced in FIG. 1 by the arrows AA' and intersects the grooves at their mid points. The slot contains an insert in the form of a comb 14 bearing on its top surface the middle parts of the grooves.

Figure 2:
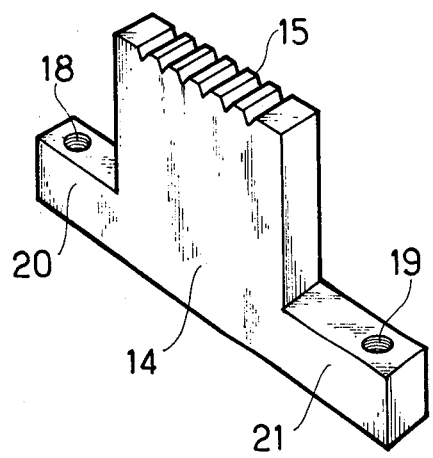
FIG. 2 is a perspective view of a part of the connection support shown in FIG. 1.

The comb 14 is shown in detail in FIG. 2. It has, teeth 15 in its top surface, which delimit gaps therebetween and which have the same spacing and the same profile as the grooves in the vicinity of the mid plane. Its position inside the slot can be adjusted so that the gaps between its teeth lie in the line of the grooves.

As will subsequently be seen, the ends of two optical fibres placed facing each other in a groove with a view to being connected together are centred so that the gap between the ends of the optical fibres will be situated in the mid plane referenced by the arrows AA', i.e. in the middle of the gap between the teeth in the comb. The result of this is that the precision in the alinement of the ends of two optical fibres to be connected together depends mainly on the precision of the gaps between the teeth of the comb 14. This property makes the connections support simple to manufacture since the grooves formed in the stand do not have to be machined with very great care and sinc it is easy to obtain high machining precision for the profiles of the gaps between the teeth of the comb 14 because of the narrowness of the comb (a few millimeters).

Figure 3:
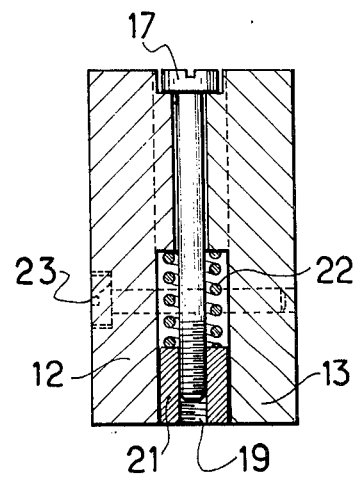
FIG. 3 is a cross-section of a different part of the support.

The height of the position of the comb 14 in the slot of the stand is adjusted by means of two draw bolts 16 and 17 and of two counter-acting springs one of which 22 is shown in FIG. 3. The two draw bolts 16 and 17 are housed in bores formed in the stand on either side of the slot, perpendicularly to the grid 1 of grooves. Their heads bear on counter-sunk shoulders just below the top surface of the stand and are screwed into tapped holes 18, 19 shown in FIG. 2, formed in tabs 20 and 21 extending laterally from the body of the comb 14. The two counter-acting springs are each installed on the shank of a bolt between the stand and the tabs 20, 21 of the comb 14 and tend to push the comb 14 towards the bottom surface of the stand.

As can be seen in FIGS. 1 and 3, the slot opens out onto the bottom surface of the stand, this making it possible to insert the comb 14 through this surface after the ends of the optical fibres have been installed on the stand.

The stand is divided into two symmetrical halves 12 and 13 along the mid plane perpendicular to the grid 1 and referenced by the arrows AA'. This division makes it possible to obtain precise automatic centring of the ends of the optical fibres to be connected together so that the transitions between the ends of the fibres will be situated in the mid plane referenced by the arrows AA'. For this purpose, it is necessary only to cable the two halves 12 and 13 of the stand separately, each half 12, respectively 13 being fixed to a plate occupying the mid plane AA' installed in the place of the other half 13 respectively 12 and used as a stop for the ends of the optical fibres.

The two halves 12 and 13 of the stand have means for centring and positioning one in relation to the other, e.g. complementary profiles fitted together arranged at their joints. They are fixed to each other by screws one of which 23 is shown in FIGS. 1 and 3.

Parallel slots 2, 3, 4 and 5 formed in the top surface of the stand perpendicularly to the grid 1 of grooves are disposed symmetrically in relation to the mid-plane referenced by the arrows AA' (FIG. 1) and divide the grid 1 of grooves into several zones:

Two end zones 6 and 7 which are situated at the ends of the top surface of the stand and in which the grooves have a semi-circular profile;

Two intermediate zones 8 and 9 delimited the one by the parallel slots 2 and 3, the other by the slots 4 and 5 in which the grooves have a V-shaped transversal profile;

And two central zones 10 and 11 situated on either side of the middle parts of the grooves in which these latter maintain their V-shaped transversal profile as in the intermediate zones 8 and 3 but that profile is a few tens of millimeters shallower.

The use of these various zones is as follows:

The end of two optical fibres 30, 31 to be connected together are placed together end on in a groove so that the transition between the two is situated in the mid plane referenced by the arrows AA'. They are stripped along a length so that the ends of their coverings reach the level of the slots 2 and 5. The ends of the coverings of the optical fibres rest in the end zones 6 and 7 of the groove where they are fixed i.e. by gluing. The ends of the optical fibres themselves rest in the intermediate zones 8 and 9 and central zones 10 and 11 of the groove. They are glued in the intermediate zones 8 and 9 and pre-positioned in the central zones 10 and 11 with a view to their subsequent alinement by the middle part of the groove borne by the comb 14.

The slots 2, 3, 4 and 5 are relatively wide and make it possible to use the resilience of the optical fibres to correct possible decentering due to the defects of the coverings and to the gluing.

The connection support, which has just been described, is implemented for the connection of two bundles of optical fibres as follows:

Firstly, each 12, 13 of the stand is cabled separately at the ends of the optical fibres of one bundle. For this operation, each half 12 respectively 13 of the stand is fixed to a plate occupying the mid plane referenced by the arrows AA', installed in the place of the other half 13 respectively 12; the ends of the optical fibres are stripped, placed in the grooves so that their ends come in contact with the plate and glued in the intermediate zone 8 or 9 of the grooves, their covering being glued in the end zone 6 or 7 of the grooves.

After the plates have been dismantled and the two halves 12 and 13 of the stand have been fixed together, the comb 14 is inserted in the stand by the bottom surface thereof and its adjusted in the slot so that the gaps between its teeth are alined with the central zones 10, 11 of the grooves and ensure final alinement of the ends of the optical fibres placed facing each other.

It is possible to insert, at the transition between the ends of the optical fibres facing each other, i.e. in the middle of the spaces between the teeth of the comb 14, a fluid having the same refraction index as the fibres to minimize the end effects and cover the central zones 10 and 11 of the grooves with protective covering materials.

It is quite evident without going beyond the scope of the invention, it is possible to modify some dispositions or to replace some means by equivalent means.

What we claim is:

1. A connection support for optical fibres comprising a stand having a working surface, in which there is a grid of parallel rectilinear grooves, each arranged for accommodating the ends of two optical fibres placed end-to-end with a view to connecting them together, wherein the transition between the two optical fibres to be connected together is effected in a part of each groove, said part being in the form of an insert which is constituted by a comb received in a slot formed in the stand along a plane perpendicular to the network of grooves, and having gaps between its teeth which extend the line of the grooves.

2. A connection support according to claim 1, including means for adjusting the height of the comb inside the slot.

3. A connection support according to claim 2, wherein said means for adjusting the height of the comb inside the slot include:
   two draw bolts housed in bores provided in the stand on either side of the slot perpendicularly to the grid of grooves, each having a head bearing on a shoulder set in the working surface of the stand and screwing into tapped holes formed in tabs projecting laterally from the comb;
   and two compression springs, each installed on the shank of a bolt and pressing on one side against the stand and on the other side on the tabs.

4. A connection support according to claim 1, wherein the stand is divided into two halves along a or the said plane perpendicular to the grooves intersecting said insert, said two halves of the stand having means for their centering and positioning in relation to each other.

5. A connection support according to claim 1, wherein the stand has parallel slots which are cut perpendicular to the network of grooves and which divide said network into several zones:
   two end zones which are situated at the ends of the grooves and in which the grooves have a semi-circular transversal profile;
   two intermediate zones which are delimited by the slots and in which the grooves have a V-shaped transversal profile; and
   two central zones situated on either side of the middle portions of the grooves in which the grooves keep a V-shaped profile as in the intermediate zones but with a slightly shallower depth.

* * * * *